(12) United States Patent
Evanitsky

(10) Patent No.: US 8,499,335 B2
(45) Date of Patent: Jul. 30, 2013

(54) ONLINE HOME IMPROVEMENT DOCUMENT MANAGEMENT SERVICE

(75) Inventor: Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 934 days.

(21) Appl. No.: 12/107,310

(22) Filed: Apr. 22, 2008

(65) Prior Publication Data
US 2009/0265761 A1    Oct. 22, 2009

(51) Int. Cl.
*H04L 29/06* (2006.01)

(52) U.S. Cl.
USPC .............. 726/3; 370/352; 370/353; 370/354; 370/355; 370/356; 358/1.15; 358/403; 706/12; 709/201; 709/203; 726/4

(58) Field of Classification Search
USPC ........... 370/352–356; 358/1.15, 403; 706/12; 709/201, 203; 707/756, 10, 100; 726/3, 4
See application file for complete search history.

(56) References Cited

U.S. PATENT DOCUMENTS

| | | | |
|---|---|---|---|
| 7,693,866 B1 * | 4/2010 | Weaver et al. | 707/999.107 |
| 7,860,746 B1 * | 12/2010 | Fitch et al. | 705/19 |
| 2002/0133410 A1 * | 9/2002 | Hermreck et al. | 705/19 |
| 2002/0156827 A1 * | 10/2002 | Lazar | 709/201 |
| 2003/0126052 A1 * | 7/2003 | Rademaekers et al. | 705/35 |
| 2006/0181742 A1 * | 8/2006 | Lech et al. | 358/453 |
| 2006/0218110 A1 * | 9/2006 | Simske et al. | 706/45 |
| 2006/0282442 A1 * | 12/2006 | Lennon et al. | 707/100 |
| 2007/0033118 A1 * | 2/2007 | Hopkinson | 705/31 |
| 2007/0168382 A1 * | 7/2007 | Tillberg et al. | 707/102 |
| 2008/0005137 A1 * | 1/2008 | Surendran et al. | 707/101 |
| 2009/0012884 A1 * | 1/2009 | Harman et al. | 705/31 |
| 2009/0300528 A1 * | 12/2009 | Stambaugh | 715/764 |

OTHER PUBLICATIONS

Zhu et al., "Extracting Relevant Named Entities for Automated Expense Reimbursement", KDD '07, Aug. 12-15, ACM. pp. 1004-1012.*

* cited by examiner

*Primary Examiner* — Brandon Hoffman
*Assistant Examiner* — Hee Song
(74) *Attorney, Agent, or Firm* — MH2 Technology Law Group LLP

(57) ABSTRACT

An online home improvement document management service includes a host server having a web-based interface adapted to facilitate secure customer access to the host server. The host server is configured to receive home improvement data communicated from the customer through use of a computing device. A processing module is in operative communication with the host server and is configured to process the home improvement data communicated from the customer. A processing software application is trained to classify the processed home improvement data and selectively extract data therefrom based on the classification. The processing software application is configured to selectively present the processed home improvement data for a customer verification via the web-based interface upon at least one of an unsuccessful classification and an unsuccessful extraction of data. A storage device is in operative communication with the processing module and is configured to store the extracted data as metadata upon at least one of the customer verification and the extraction. A content management software application is configured to detect at least one of a customer request through the web-based interface and at least one triggering condition corresponding to the metadata. The content management software application generates at least one report based on the detection of at least one of the customer request and the at least one triggering condition.

20 Claims, 3 Drawing Sheets

ONLINE HOME IMPROVEMENT DOCUMENT MANAGEMENT SERVICE

BACKGROUND

1. Technical Field

The present disclosure relates to an online data processing service, and, in particular, to a system and method for providing an online management service for personal documents, such as home improvement documents.

2. Description of Related Art

A home is often the most important investment made in one's lifetime. Unfortunately for the homeowner, the home is typically a primary target of government taxes such as capital gains taxes and inheritance taxes. When purchasing or selling a home, one rarely thinks about such tax implications. Generally, these taxes are based on the current value of the home minus the home purchase price minus the improvements made on the home. Thus, over an extended period of time, home improvements made on the home can significantly lower the capital gains and inheritance taxes on the home once it changes hands, whether sold or inherited. Homeowners rarely keep all documents reflecting home improvement costs and, as a result, end up paying more capital gains and/or inheritance taxes than necessary.

Managing personal documents can be a difficult task for anyone. Home improvement documents, in particular, typically include extensive documentation including contracts for services/work, receipts for products purchased, and photographs documenting improvements. Further, since most home improvement documents are paper-based, these documents are kept in a box, dresser drawer, file cabinet, or even thrown away. Additionally, many homeowners are unaware of the implications of home improvements on taxes such as capital gains and, thus, fail to appreciate the advantage of keeping and managing home improvement documents.

SUMMARY

In an embodiment of the present disclosure, an online home improvement document management service includes a host server having a web-based interface adapted to facilitate secure customer access to the host server. The host server is configured to receive home improvement data communicated from the customer through use of a computing device. A processing module is in operative communication with the host server and is configured to process the home improvement data communicated from the customer. A processing software application is trained to classify the processed home improvement data and selectively extract data therefrom based on the classification. The processing software application is configured to selectively present the processed home improvement data for a customer verification via the web-based interface upon at least one of an unsuccessful classification and an unsuccessful extraction of data. A storage device is in operative communication with the processing module and is configured to store the extracted data as metadata upon at least one of the customer verification and the extraction. A content management software application is configured to detect at least one of a customer request through the web-based interface and at least one triggering condition corresponding to the metadata. The content management software application generates at least one report based on the detection of at least one of the customer request and the at least one triggering condition.

According to another embodiment of the present disclosure, an online home improvement document management service includes a host server having a web-based interface adapted to facilitate secure customer access to the host server. The host server is configured to receive home improvement data communicated from the customer through use of a computing device. The home improvement data includes at least one of an imaged home improvement document and information relating to the imaged home improvement document. An authentication module is operably coupled to the host server and is adapted to operate on the web-based interface to control access to the data management service utilizing at least one authentication mechanism. A processing module is in operative communication with the host server and is configured to process the home improvement data communicated from the customer and selectively extract data from the processed information. A storage device is in operative communication with the processing module and is configured to store the extracted data as metadata for representation via the web-based interface. A tracking software application operates on the host server and is configured to continuously process the metadata to detect at least one triggering condition corresponding to the home improvement data. A content management software application operates on the host server and is configured to process a customer request through the web-based interface. The content management software application generates at least one report based on the detection of at least one of the customer request and the at least one triggering condition.

The present disclosure also provides for a method for providing an online home improvement document management service. The method includes the initial steps of training the service to successfully classify at least one home improvement document and facilitating secure customer access to the service through a web-based interface to receive home improvement data communicated from the customer through use of a computing device. The method also includes the steps of processing the home improvement data communicated from the customer and classifying the processed home improvement data and selectively extracting data therefrom based on the classification. The method also includes the steps of selectively presenting the processed home improvement data for a customer verification via the web-based interface upon at least one of an unsuccessful classification and an unsuccessful extraction of data and storing the processed home improvement data in a user profile corresponding to the customer upon at least one of the customer verification and the extraction. The method also includes the steps of detecting at least one of a customer request through the web-based interface and at least one triggering condition corresponding to the processed home improvement and selectively generating the at least one report based on at least one of the detection of the at least one triggering condition and the customer request.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
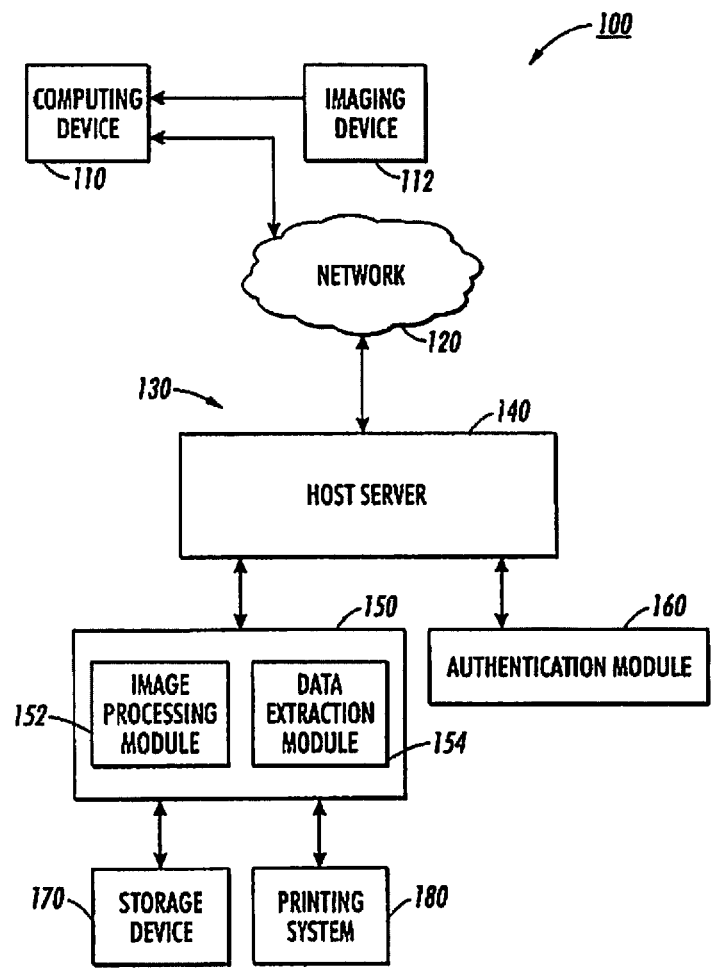
FIG. 1 is a block diagram of an online home improvement document management service in accordance with the present disclosure.

Embodiments of the presently disclosed advertisement system will now be described in detail with reference to the drawings in which like reference numerals designate identical or corresponding elements in each of the several views.

The present disclosure relates to an online data processing service, and, in particular, to a system and method for an online management service for personal documents related to home improvements. In an embodiment of the present disclosure, personal documents are stored and managed on a host system having a host server accessible by customers through use of a computing device (e.g., cell phone, computer, etc.). Customers accessing the host server are greeted by a website interface adapted to provide personal services. For example, personal services may be provided by Xerox® Corporation through a Xerox® Personal Services (XPS) website. More specifically, the personal services website or XPS website may employ a user interface (UI) adapted to enable the customer to utilize a service such as Software-as-a-Service ("SaaS") to manage, access, and reproduce their home improvement documents. Saas is a software application delivery model where a software vendor develops a web-native software application and hosts and operates (either independently or through a third-party) the application for use by its customers over a network (e.g., the Internet). Customers do not pay for owning the software itself but rather for using the service. That is, the customers may pay a periodic subscription fee (e.g., monthly, annually, etc.) for the right to use the software over the Internet (e.g., through the UI). In other embodiments, the customer may pay a one time fee to gain access to the service for the duration of home ownership. That is, the one-time fee allows the customer to access and use the service until title to the home changes hands. In this scenario, the service may be offered at a discount relative to a pro-rated periodic fee structure in exchange for long-term loyalty to the service. In other embodiments, a usage fee may be charged for each document processed along with additional fees for storage and access. Upon expiration of the subscription and/or in the event the customer no longer wishes to subscribe to or use the service, the XPS may provide the customer with a DVD and/or a CD ROM having a complete archive of the customer's data stored thereon. Further, the XPS may provide the customer with a suitable software application that is adapted to extract the archived data from the DVD or CD ROM to the customer's computing device for viewing.

In embodiments, the customer may be the homeowner or a third party granted authorization from the homeowner to access the service on the XPS website, as will be discussed below. In embodiments, the SaaS may incorporate a tax processing software that operates to process home improvement data and output reports, alerts, and/or tax forms related to capital gains taxes and inheritance taxes. Reports and/or alerts may be provided to customers regarding tax benefit eligibilities for the current tax year such as, for example, energy saving tax deductions (e.g., energy efficient window replacements, furnace upgrades, etc.). In addition to a home improvement document management service, the XPS website may provide a variety of data management services (e.g., tax document management service, warranty management service) to which customers may subscribe and access through a common UI or through one or more related websites.

The customer may utilize an imaging device (e.g., scanner, camera, cell phone, etc.) to capture images of documents and subsequently communicate the captured image data to a computing device. The computing device is adapted to upload (e.g., utilizing FTP, drag-and-drop, etc.) the scanned images as image files (e.g., digital image files) to the host server through use of the UI. Once uploaded, documents are processed by the host system and presented to the customer to enable a quality assurance check, as will be discussed in further detail below. It should be appreciated that the customer may also upload captured image data from a hand-held computing device (e.g., cell phone, PDA, etc.) to the host server directly. For example, the customer may utilize a web-enabled cell phone camera to capture an image of a home improvement document and access the host server directly to upload the captured image data. The customer may further utilize the UI to input home improvement and/or tax information that may not be adapted for imaging and/or scanning. For example, customers may choose to input supplemental information to complement uploaded image files such as, for example, key dates, category of home improvement (e.g., interior, exterior), warranty expirations, particular home improved (e.g., primary home, vacation home, etc.).

In embodiments, a variety of authentication mechanisms (e.g., username, password, etc.) may be employed to prevent unauthorized access to the service. In this scenario, authenticating information such as, for example, a username and password is required to access the service and/or the personal data of the customer. Further, the customer may grant authorization privileges to third parties (e.g., spouse, relatives, accountant, attorney, power of attorney, business partner, guardian, etc.), which allows them access to the account of the homeowner. Once secure access to the service is gained and the customer has uploaded the desired files to the host system, the files are processed by the host system and key data is extracted from the processed files and stored in a storage device (e.g., a database) as metadata in a user profile or folder designated for a given customer. In embodiments, the host system may, in addition to metadata, store images of the uploaded files as digital image files (e.g., JPG, GIF, PNG, TIF, etc.) or as PDF files in the storage device to provide archive protection. In this manner, the XPS may offer a guarantee that uploaded documents will not be altered once received and processed by the host system. That is, once documents are uploaded, processed, and stored by the host system, customers need not be concerned with misplacing or losing so-called "hard copy" documents.

The SaaS may incorporate a content management software application adapted to monitor the stored metadata to track and detect one or more triggering conditions. The triggering condition may be, for example, a tax deduction for the current tax year and/or a warranty expiration. Triggering conditions may be tracked by the content management software application as part of the service and/or via automatic connection to other services offered by the XPS such as, for example, a warranty tracking service and/or a tax document tracking service. Based on the detection of a triggering condition, the service generates a report to the customer(s) regarding the triggering condition. In embodiments, the service may generate a report to surviving heirs of the homeowner to inform such parties of inheritance tax implications. Further, the service may provide the appropriate tax form(s) to the customer or authorized third-parties based on the triggering condition detected. The tax form(s) may be provided with pre-populated entries of key information based on the data extracted from processed files.

The host system may employ a suitable processing software application having optical character recognition ("OCR") functionality to process uploaded files and extract key data therefrom for storage in the user profile of the customer. The processing software application is "trained" with sample sets of home improvement documents to enable identification and extraction of key data depending on the type or classification of document processed. In embodiments, file paths to specific metadata stored in the storage device may be graphically represented as associated links (e.g., hyperlinks) on the XPS website. The customer selects an associated link to view information (e.g., document images) stored in the user profile. The user profile may be configured such that the customer may view information according to any one or more categories such as, for example, homes owned, time periods, home improvement categories, etc. In this way, all associated links may be discovered by the customer through the UI and all the information in the user profile may be reviewed for accuracy. The customer can then make necessary changes to the user profile accordingly.

The service further utilizes the extracted data to automatically manage home improvement documents and related tax deductions. More specifically, based on the extracted data the service provides notifications or reports related to tax implications and/or warranty expirations to the customer and, further, provides notifications or reports to third parties authorized to receive such information. Reports may be provided through a variety of methods, as will be discussed in further detail below.

In embodiments, the service is adapted to reproduce home improvement documents in a so-called "hard copy" format (e.g., via a Xerographic printing device), and/or graphically over a network (e.g., via the UI of the XPS website, incorporated in an email, etc.) at the request of the customer or an authorized third-party. For example, the customer may utilize the UI to select a link configured to generate a reproduction of any one or more home improvement documents in any one or more formats listed above. Document reproductions may be generated separately from reports, generated with reports, and/or generated as the report itself.

For each home improvement document managed by the service, the corresponding metadata may include vital information such as, for example, the original purchase agreement of the home (e.g., to establish the base value of the home), contracts for work completed (e.g., additions, remodeling, landscaping, etc.), receipts for new windows, doors, driveways, central air conditioning, upgraded heating systems, and photographs of before and after images to document changes and/or improvements. Other vital information may be included and the above list should not be construed as exhaustive. The XPS website may include other associated links representing file paths to supplemental information available to the customer (e.g., dates, home locations, rental information, property tax information, etc.) and stored in the user profile of that customer. In embodiments, the UI may include search functionality to permit the customer to methodically search metadata and/or content stored in the user profile. That is, the customer may search and/or sort their home improvement information based on any one or more vital information parameters included in the metadata, as listed above.

Customer-selected preferences may be utilized to customize the XPS website experience for each customer individually. For example, customers may utilize the UI to generate document reproductions and/or reports, select recipients of document reproductions and/or reports, and, further, methods of communicating document reproductions and/or reports (e.g., email, snail mail, UI, etc.) generated by the service.

Reference is first made to FIG. 1, which shows system architecture of a data processing system 100 adapted to process, store, and manage documents in accordance with embodiments of the present disclosure.

Generally, data processing system 100 includes at least one computing device 110 and a host system 130. The host system 130 includes a host server 140 accessible by the computing device 110 via a network 120 (e.g., Internet, WAN, LAN, Bluetooth, etc.). The computing device 110 may be any known computing device (e.g., computer, hand-held computing device, cell phone, personal digital assistant (PDA), etc.) suitable to communicate data over a network (e.g., Internet, WAN, LAN, Bluetooth, etc.). In embodiments, the computing device 110 may include several components, including a processor, RAM, a hard disk drive, a USB interface, a network interface, a computer display/monitor, a computer mouse, a computer keyboard, and/or other components. Computing device 110 may also include software adapted to provide document management functionality and/or digital image management functionality.

In the illustrated embodiment, the computing device 110 is adapted to operably communicate with an imaging device 112 (e.g., a xerographic copy device, a camera, a scanner, a cellular phone, etc.). It will be appreciated that the imaging device 112 may utilize image capture technology to scan documents which are subsequently converted to digital image files (e.g., JPG, GIF, PNG, TIF, etc.) utilizing a suitable software driver. The digital image files are subsequently communicated to the computing device 110. The customer accesses the host server 140 via the network 120 to upload the scanned image file thereto, as will be discussed in further detail below. In embodiments, the imaging device 112 and computing device 110 may be integrally formed. For example, a cell phone including an onboard camera may be utilized to scan, process, and communicate home improvement documents directly to the host server 140.

The host server 140 may be any suitable network device running any known operating system and configured to communicate data over the network 120. In other words, a computer, switch, router, gateway, network bridge, proxy device or other network device that is programmed or otherwise configured to operate as explained herein is considered an embodiment of this disclosure. It should be appreciated that any data communicated to or from the host server 140 may be encrypted by the service to ensure that customer information is kept private.

The host system 130 further includes a processing module 150 in operable communication with the host server 140. The processing module 150 includes an image processing module 152 adapted to process uploaded image files and an extraction module 154 adapted to extract data from the image files processed by the image processing module 152. In embodiments, the image processing module 152 employs an optical character recognition ("OCR") software application to process the uploaded image files. Several OCR software applications are presently commercially available (e.g., Brainware, XRCE Categorizer, etc.). It should be appreciated that embodiments of the present disclosure are adapted to operate utilizing any OCR software application within the purview of one skilled in the art. Upon processing by the OCR, the processed image files are classified (e.g., by document type) by the extraction module 154 using a suitable processing software application. The processing software application may be the OCR itself or, alternatively, a separate software application. Based on the classification, the processing software application extracts key data from the classified document. Typically, software applications utilized to seek out data from unstructured or semi-structured documents require "training" with sample sets of unstructured data. This training enables the processing software application to recognize key data on a given document to classify the document (e.g., category of home improvement document) and, based on this classification, seek out and extract pertinent data therefrom. Typically, home improvement documents are semi-structured and include key words and information that the processing software application may be trained to detect and extract. The processing software application is "trained" with sample sets of home improvement documents and documents related thereto to enable the classification of documents and extraction of key data therefrom.

In embodiments, the service enables the customer to perform a quality assurance check of all documents processed by the system 100 prior to storage therein. For example, if the processing software application is unable to extract data from a document and/or classify the document with certainty, the customer is alerted through the UI. In response to this alert, the customer may utilize the UI to verify the classification of the document and/or the data from the document and, further, make corresponding modifications. Further, the system 100 is self-learning in that each successful classification and extraction related to a processed document enables the system 100 to accumulate a so-called "knowledge-base" of home improvement documents to complement the trained processing software application. In this way, the system 100 learns with each document processed, whether successfully or unsuccessfully and subsequently verified and/or modified. That is, once a document or document type has been verified and stored by the system 100, subsequent documents of the same or substantially similar type may not require verification by the customer thereafter.

The data extracted by the data extraction module 154 is stored in a storage device 170 in operative communication with the processing module 150. In embodiments, the storage device 150 may be a database or a plurality of databases in operative communication with the processing module 150. In other embodiments, the host server 140 may include one or more onboard databases.

In the illustrated embodiment, the host system 130 includes a printing system 180 in operative communication with the processing module 150. The printing system 140 may be, for example, one or more xerographic printing devices configured to retrieve print instructions from the service corresponding to a report and/or document reproduction, and, subsequently, print the appropriate document onto a substrate (e.g., printing paper, photo paper, etc.). Once printed, the document may be mailed to the intended recipient (e.g., by an XPS representative) and/or made available for pickup by the customer (e.g., at an XPS office location). Reports may include a document reproduction, a complete history of home improvement data for one or more homes, accompanying tax forms for filing with the Internal Revenue Service, an alert that a particular warranty has expired, tax benefit eligibility information for the current tax year, etc. Additionally or alternatively, the report may be intended to provide a third party (e.g., the homeowner's heirs) with appropriate tax information related to home improvements (e.g., inheritance tax) and accompanying tax forms for filing with the Internal Revenue Service. Reports and/or document reproductions may be automatically generated and/or selectively generated by the customer via the UI.

In embodiments, the printing system 180 may be any suitable web-enabled printing device adapted to receive print instructions over a network (e.g., the Internet) from the host server 140 or locally from the customer's remote computing device (e.g., cell phone, laptop, PDA, etc.). In this scenario, the customer accesses the service through the UI of the XPS website with a web-enabled computing device and requests a report and/or a document reproduction be printed from a printer at a location near the customer or convenient for the situation. In this manner, the customer may use the service to print a desired document from the printer of a third party who may be requesting the document (e.g., accountant, family member, etc.). Alternatively, the customer may utilize the UI to generate a graphical reproduction of the desired document and/or to display related information on the display of a web-enabled cell phone or PDA to show the requesting party.

In embodiments, the content management software application monitors the metadata stored in the storage device 170 for a triggering condition. The triggering condition may be, for example, a tax benefit for the current tax year discovered by the service (e.g., via onboard tax document tracking software). Additionally or alternatively, the triggering condition may be an impending warranty expiration for a product or home improvement service performed. Upon detection of the triggering condition, the service causes the printing system 180 to print the appropriate document(s) (e.g., report, document reproduction, etc.) for mailing to the intended recipient. In this manner, customers may receive documents in a so-called "hard-copy" format from the host system 130.

In embodiments, documents may be sent from the host server 140 to the computing device 110 via a customer-selected email address over the network 120. That is, the customer may utilize the UI to specify one or more email addresses at which to receive documents and/or related information and to select a link to cause such email to be sent. In this scenario, the service monitors the metadata stored in the storage device 170 for trigger conditions and generates an email report to the one or more customer-selected email addresses based on a detected trigger condition. In embodiments, reports and/or document reproductions may be provided graphically on the UI of the XPS website at the request of the customer. In this manner, the customer may quickly and conveniently access the service (e.g., via cell phone, laptop, etc.) to retrieve information and/or documents therefrom. It should be appreciated that generating reports and/or document reproductions in email format does not preclude the service from generating additional reports via the UI and in hard-copy format via the printing system 180.

In embodiments, the metadata stored in the storage device 170 may be updated and/or changed manually (e.g., by an XPS technician). For example, a host server administrator and/or an XPS technician may gather up-to-date information (e.g., tax codes, warranty information, contact information, etc.) by contacting the appropriate parties (e.g., the I.R.S.) directly. In another embodiment, the host system 130 may automatically track up-to-date information via the Internet. For example, the SaaS may employ a suitable web application (e.g., web 2.0®, mashup applications, etc.) to provide the customer with updated information from multiple websites for that purpose. In this way, the service may be configured such that the most recent tax codes and forms are automatically updated to the host system 130 over the Internet. In embodiments, the host server 140 may be granted access (e.g., over a network) to a government managed database to allow the host system 130 to track up-to-date tax codes and forms. The tracked information is compared to corresponding tax data stored in the storage device 170 and utilized to update the host system 130 accordingly.

Use of the data processing system 100 according to embodiments of the present disclosure will now be discussed. Starting from the computing device 110, access to a secure web portal located on the host server 140 may be gained via the network 120 using security protocols such as, for example, secure sockets layer (SSL) or secure HTTP (S-HTTP). Secure access may be managed by the authentication module 160 employing a suitable authentication mechanism. That is, once a secure link is established, the authentication module 160 may prompt the customer to input a user name and password, account number, key words, a challenge-response test (e.g., CAPTCHA™), or other identifying information to facilitate access to the service. Once secure access to the service is gained, the customer may interact with the UI to select an associated link to a particular management service such as, for example, the home improvement document management service. Additional associated links may be provided for other document management services which may be offered by the XPS (e.g., warranty tracking service, tax document tracking service, etc.). Once a specific management service is selected, the customer may upload image files and/or data to the host server 140 related to that particular service.

In embodiments, the customer may choose to receive a report and/or document reproduction pertaining to any one or more parameters such as, for example, a particular home owned (e.g., vacation home, investment home), time periods (e.g., home improvements for a specific calendar year), and home improvement categories (e.g., interior improvements, exterior improvements, etc.). In this scenario, the service may provide, via the UI, links configured to generate information such as reports and/or document reproductions corresponding to any one or more of the parameters listed above. Additional links may be provided that are configured to permit the customer to choose the format(s) in which information will be generated. For example, the customer may select a link to have information for a particular parameter emailed to an email address of their choosing and/or graphically represented via the UI of the XPS website. Additionally or alternatively, the customer may choose to receive information in a hard-copy format from the printing system 180. In embodiments, the customer may additionally choose to have information (e.g., reports, document reproductions, etc.) sent to third parties (e.g., heirs, accountant, attorney, power of attorney, etc.).

In the illustrated embodiment, the data processing system 100 includes a single computing device 110 adapted to communicate with the host system 130. This configuration is illustrative only in that access to the host server 140 may be gained by any paying customer (e.g., as dictated by the authentication module 160) utilizing a suitable web-enabled computing device.

Figure 2:
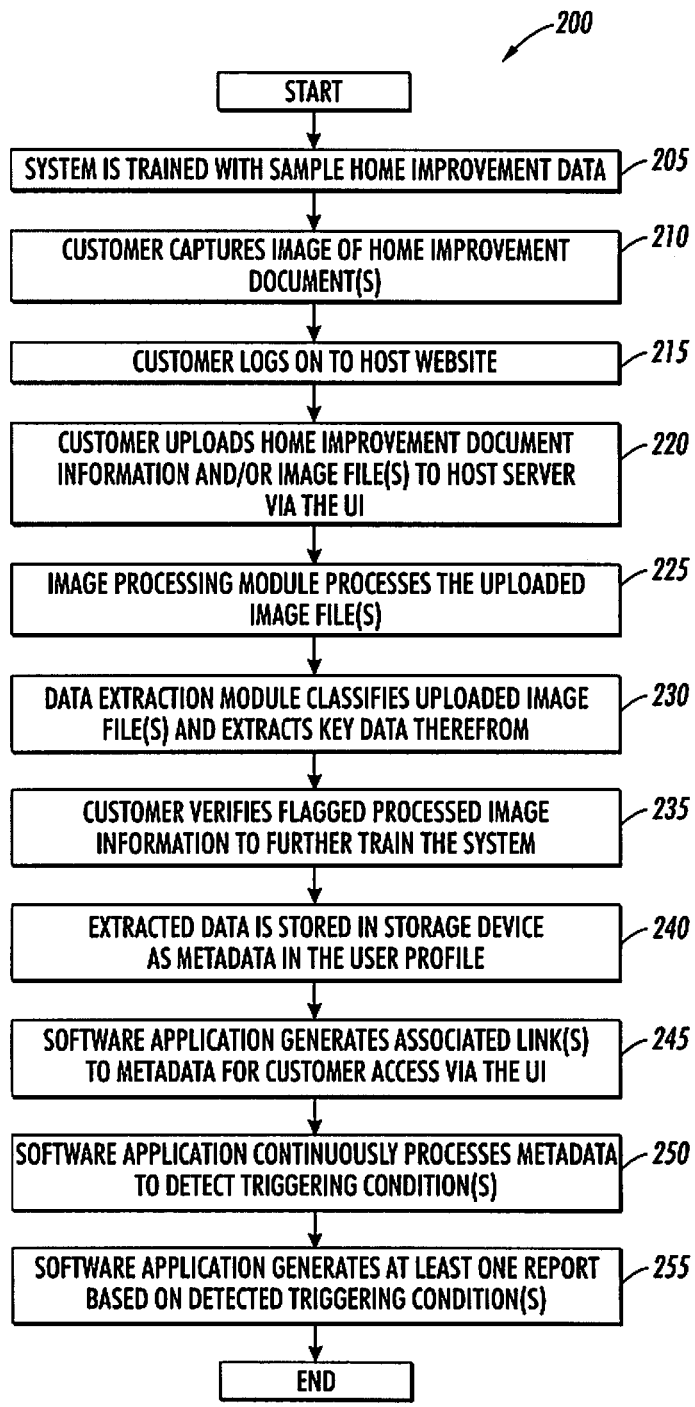
FIG. 2 is a flow chart diagram illustrating a method for providing an online home improvement document management service in accordance with one embodiment of the present disclosure.

FIG. 2 illustrates a method 200 for utilizing embodiments of the system disclosed herein. In step 205, the processing software application is trained with sample sets of unstructured and/or semi-structured home improvement documents. In step 210, the customer utilizes the imaging device 112 to capture an image of the desired home improvement documents. The computing device 110 interfaces with the imaging device 112 to receive the imaged documents therefrom or, alternatively, the computing device 110 is adapted to image the documents itself (e.g., a cell phone). The computing device 110 may be adapted to manage the imaged documents as digital image files (e.g., via any suitable digital imaging software application). In step 215, the customer gains secure access to the host server 140 by logging on to the XPS website utilizing one or more authentication mechanisms (e.g., user name and password) managed by the authentication module 160. Once secure access to the host server 140 is gained, the customer utilizes the UI to access the home improvement document management service and uploads home improvement information and/or imaged document(s) from the computing device 110 to the host server 140 in step 220. In step 225, the processing module 150 executes the trained processing software application which, in turn, classifies the imaged document(s) and extracts key data therefrom in step 230. Upon an unsuccessful classification and/or extraction of an uploaded document, the processing software application flags the document and/or alerts the customer via the UI to allow the customer to verify the related information and make any necessary changes in step 235. In this manner, the training of the system 100 is ongoing with each subsequent document uploaded. In step 240, the key data extracted in step 230 and/or the data verified in step 235 is stored in the storage device 170 as metadata in the user profile of the customer. In step 245, the service generates associated links on the XPS website that the customer may select to access the user profile and view home improvement documents and related information. In step 250, the service monitors (e.g., via the content management software) the metadata stored in the storage device 170 to detect one or more triggering conditions and, in step 255, the service generates one or more reports (e.g., via email, the UI, and/or hard-copy) based on the one or more detected triggering conditions.

Figure 3:
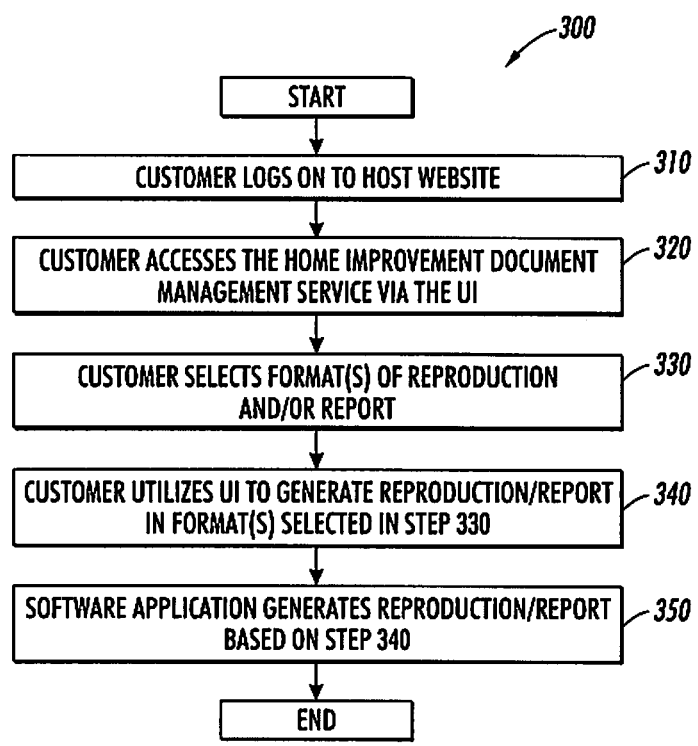
FIG. 3 is a flow chart diagram illustrating a method for providing an online home improvement document management service in accordance with another embodiment of the present disclosure.

FIG. 3 illustrates a method 300 for selectively generating a document reproduction and/or report according to embodiments of the present disclosure. In step 310, the customer gains secure access to the host server 140 by logging on to the XPS website utilizing one or more authentication mechanisms (e.g., user name and password) managed by the authentication module 160. Once secure access to the host server 140 is gained, the customer accesses the home improvement document management service in step 320. In step 330, the customer selects the format or formats (e.g., hard copy, email, UI) in which the document reproduction and/or report is to be generated. In step 340, the customer utilizes the UI (e.g., selects a link) to generate the document reproduction and/or report in the format(s) selected in step 330. In step 350, the service generates the document reproduction and/or report based on the customer selection in step 340.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of providing an online home improvement document management service, the method comprising:
   receiving an imaged home improvement document from a computing device;
   performing optical character recognition on the imaged home improvement document to derive document text;
   assigning the imaged home improvement document a classification based on the document text, an indication of the classification from a user, or both;
   extracting a subset of the document text as home improvement data based on the classification, wherein the home improvement data is for a property owned by a property owner;

transmitting the home improvement data to the user;
receiving verification of the home improvement data from the user;
storing the home improvement data in a storage device based on the verification of the home improvement data from the user;
detecting, by one or more processors, a triggering condition regarding a tax implication based on the home improvement data; and
alerting a user of the tax implication.

2. The method of claim 1, wherein the user is the property owner.

3. The method of claim 1, wherein the user is a third party.

4. The method of claim 3, wherein the third party is an heir of the property owner.

5. The method of claim 4, wherein the tax implication comprises an inheritance tax with respect to the property.

6. The method of claim 1, wherein the tax implication comprises a capital gains tax with respect to the property.

7. The method of claim 1, further comprising:
transmitting one or more tax forms to the user related to the tax implication.

8. The method of claim 7, further comprising:
populating entries in the one or more tax forms with information derived from the home improvement data prior to transmitting the one or more tax forms to the user.

9. The method of claim 7, further comprising:
retrieving the one or more tax forms from a government database prior to transmitting the one or more tax forms to the user.

10. The method of claim 1, further comprising:
retrieving tax information from one or more websites; and
wherein detecting the triggering condition comprises consulting the tax information to determine the tax implication.

11. A system configured to provide an online home improvement document management service, the system comprising:
a processing system comprising one more processors; and
a memory system comprising one or more computer-readable media, wherein the computer-readable media contain instructions that, when executed by the processing system, cause the processing system to perform operations comprising:
receiving an imaged home improvement document from a computing device;
performing optical character recognition on the imaged home improvement document to derive document text;
assigning the imaged home improvement document a classification based on the document text, an indication of the classification from a user, or both;
extracting a subset of the document text as home improvement data based on the classification, wherein the home improvement data is for a property owned by a owner;
transmitting the home improvement data to the user;
receiving verification of the home improvement data from the user;
storing the home improvement data in the memory system based on the verification of the home improvement data from the user;
detecting a triggering condition regarding a tax implication based on the home improvement data; and
alerting a user of the tax implication.

12. The system of claim 11, wherein the user is the property owner.

13. The system of claim 11, wherein the user is a third party.

14. The system of claim 13, wherein the third party is an heir of the property owner.

15. The system of claim 14, wherein the tax implication comprises an inheritance tax with respect to the property.

16. The system of claim 11, wherein the tax implication comprises a capital gains tax with respect to the property.

17. The system of claim 11, the operations further comprising:
transmitting one or more tax forms to the user related to the tax implication.

18. The system of claim 17, the operations further comprising:
populating entries in the one or more tax forms with information derived from the home improvement data prior to transmitting the one or more tax forms to the user.

19. The system of claim 17, the operations further comprising:
retrieving the one or more tax forms from a government database prior to transmitting the one or more tax forms to the user.

20. The system of claim 11, the operations further comprising:
retrieving tax information from one or more websites; and
wherein detecting the triggering condition comprises consulting the tax information to determine the tax implication.

* * * * *